US012512083B2

(12) United States Patent
Sasaki et al.

(10) Patent No.: US 12,512,083 B2
(45) Date of Patent: Dec. 30, 2025

(54) PARAMETER CONTROL DEVICE AND METHOD OF CONTROLLING PARAMETER

(71) Applicant: YAMAHA CORPORATION, Hamamatsu (JP)

(72) Inventors: Naoya Sasaki, Hamamatsu (JP); Masahiko Hasebe, Hamamatsu (JP)

(73) Assignee: YAMAHA CORPORATION, Hamamatsu (JP)

( * ) Notice: Subject to any disclaimer, the term of this patent is extended or adjusted under 35 U.S.C. 154(b) by 759 days.

(21) Appl. No.: 17/182,928

(22) Filed: Feb. 23, 2021

(65) Prior Publication Data

US 2021/0295810 A1 Sep. 23, 2021

(30) Foreign Application Priority Data

Mar. 18, 2020 (JP) ................................. 2020-048247

(51) Int. Cl.

*G10H 1/00* (2006.01)
*G10H 1/34* (2006.01)
*G10H 1/36* (2006.01)

(52) U.S. Cl.

CPC ........... *G10H 1/0008* (2013.01); *G10H 1/344* (2013.01); *G10H 1/346* (2013.01); *G10H 1/365* (2013.01);

(Continued)

(58) Field of Classification Search

CPC ...... G10H 1/0008; G10H 1/344; G10H 1/346; G10H 1/365; G10H 1/368; G10H 2220/096; G10H 2220/116; G10H 2220/161

See application file for complete search history.

(56) References Cited

U.S. PATENT DOCUMENTS

2002/0078820 A1* 6/2002 Miyake ................ G10H 1/0091 84/662
2007/0229474 A1* 10/2007 Okabayashi ........ G06F 3/04847 345/173

(Continued)

FOREIGN PATENT DOCUMENTS

CN 107430849 A 12/2017
CN 108140402 A 6/2018

(Continued)

OTHER PUBLICATIONS

English translation of Office Action issued in Chinese Appln. No. 202110235608.2 mailed Jun. 7, 2023.

(Continued)

*Primary Examiner* — Jianchun Qin

(74) *Attorney, Agent, or Firm* — ROSSI, KIMMS & McDOWELL LLP

(57) ABSTRACT

A parameter control device according to an embodiment includes a value acquiring unit and a parameter output unit. The value acquiring unit acquires an indicating value of a first operation element. The parameter output unit outputs a plurality of parameter values corresponding to the acquired indicating value, based on setting information and a correspondence relation between the indicating value and a coordinate in an area defined by a plurality of coordinate axes. The setting information is for setting a relation between a plurality of parameter values and a coordinate. The plurality of parameter values being for controlling a state of content.

22 Claims, 8 Drawing Sheets

(52) U.S. Cl.
CPC ....... *G10H 1/368* (2013.01); *G10H 2220/096* (2013.01); *G10H 2220/116* (2013.01); *G10H 2220/161* (2013.01)

(56) References Cited

U.S. PATENT DOCUMENTS

| | | | |
|---|---|---|---|
| 2015/0110281 A1 | | 4/2015 | Mizuhiki |
| 2016/0246935 A1 | * | 8/2016 | Cerny .................. A61N 1/0551 |
| 2017/0097803 A1 | | 4/2017 | Herlofsson |
| 2017/0221464 A1 | | 8/2017 | Ohta |
| 2018/0005617 A1 | | 1/2018 | Hamano et al. |

FOREIGN PATENT DOCUMENTS

| | | | | |
|---|---|---|---|---|
| CN | 109558052 A | | 4/2019 |
| DE | 202012204127 A1 | | 7/2013 |
| JP | H09185376 A | | 7/1997 |
| JP | 2002258854 A | | 9/2002 |
| JP | 2003114677 A | | 4/2003 |
| JP | 2003195867 A | | 7/2003 |
| JP | 2004012842 A | * | 1/2004 |
| JP | 2011197429 A | * | 10/2011 |
| JP | 2011197430 A | | 10/2011 |
| JP | 2012145688 A | | 8/2012 |
| JP | 2016081043 A | | 5/2016 |
| JP | 2016081044 A | | 5/2016 |
| JP | 2016081045 A | | 5/2016 |
| JP | 2017129604 A | * | 7/2017 |

OTHER PUBLICATIONS

English translation of German Office Action issued in German Appln. No. 102021202105.0 dated Mar. 13, 2024.

* cited by examiner

Setting Table

| Parameter | Setting A | Setting B | Setting C | Setting D |
|---|---|---|---|---|
| PM_1 | 0, 1, 0, 0 | 0, 0, 0, 1 | 1, 0, 0, 0 | 1, 0, 0, 0 |
| PM_2 | 83 | 66 | 95 | 20 |
| PM_3 | 55 | 125 | 39 | 40 |
| ⋮ | ⋮ | ⋮ | ⋮ | ⋮ |
| PM_n | 25 | 0 | 81 | 105 |

FIG.5

Parameter Conversion Table

| Coordinate | Parameter Values (Parameter Set) |
|---|---|
| (0, 0) | (0, 1, 0, 0, 89, 45, ···, 18) |
| ⋮ | ⋮ |
| (0, 9) | (0, 1, 0, 0, 83, 55, ···, 25) |
| (0, 10) | (0, 1, 0, 0, 84, 53, ···, 20) |
| ⋮ | ⋮ |
| (22, 20) | (0, 0, 1, 0, 55, 110, ···, 86) |

FIG.6

Value Conversion Table

| Indicating Value | Indicated coordinate |
|---|---|
| 0 | (3, 8) |
| ⋮ | ⋮ |
| 63 | (11, 11) |
| 64 | (11, 12) |
| ⋮ | ⋮ |
| 127 | (19, 15) |

PARAMETER CONTROL DEVICE AND METHOD OF CONTROLLING PARAMETER

CROSS-REFERENCE TO RELATED APPLICATIONS

This application is based upon and claims the benefit of priority from the prior Japanese Patent Application No. 2020-48247, filed on Mar. 18, 2020, the entire contents of which are incorporated herein by reference.

FIELD

The present disclosure relates to techniques for controlling parameters.

BACKGROUND

An electronic musical instrument outputs sound based on various parameters. These parameters include those that can be varied in real time by a controller provided in the electronic musical instrument. Various performance expressions are possible by varying parameters in real time. Generally, one parameter is assigned to one controller. If a plurality of parameters are to be varied simultaneously, it is necessary to operate a plurality of controllers. Techniques for operating a plurality of controllers simultaneously by operating a single controller have been developed (for example, Japanese laid-open patent publication No. 2017-129604, Japanese laid-open patent publication No. 2016-81043, Japanese laid-open patent publication No. 2016-81044, and Japanese laid-open patent publication No. 2016-81045).

SUMMARY

A parameter control device according to an embodiment of the present disclosure includes a value acquiring unit and a parameter output unit is provided. The value acquiring unit acquires the indicating value of a first operation element. The parameter output unit outputs a plurality of parameter values corresponding to the acquired indicating value, based on a setting information and a correspondence relation between the indicating value and the coordinate in an area defined by a plurality of coordinate axes. The setting information is for setting a relation between a plurality of parameter values and a coordinate. The plurality of parameter values being for controlling a state of content.

A method of controlling a parameter according to an embodiment of the present disclosure includes acquiring an indicating value of a first operation element, and outputting a plurality of parameter value corresponding to the acquired indicating value, based on a setting information and a correspondence relation between the indicating value and the coordinate in an area defined by a plurality of coordinate axes. The setting information is for setting a relation between a plurality of parameter values and a coordinate. The plurality of parameter values being for controlling a state of content.

BRIEF DESCRIPTION OF THE DRAWINGS

FIG. 5 is a diagram illustrating a parameter conversion table according to the first embodiment;

FIG. 6 is a diagram illustrating a value conversion table according to the first embodiment;

DESCRIPTION OF EMBODIMENTS

Figure 1:
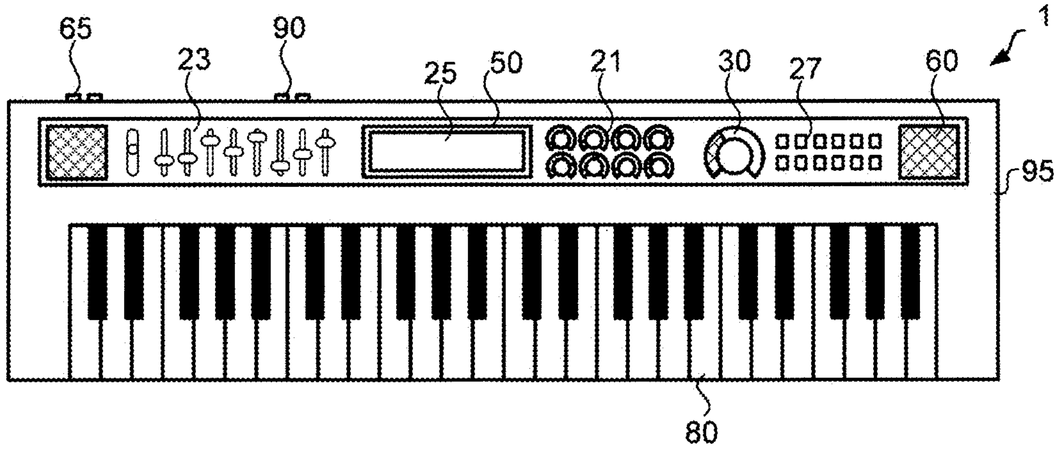
FIG. 1 is a diagram illustrating an external view of an electronic keyboard device according to the first embodiment.

Hereinafter, an electronic keyboard device according to an embodiment of the present disclosure will be described in detail by referring to the drawings. The following embodiments are examples of embodiments of the present disclosure, and the present disclosure is not to be construed as being limited to these embodiments. In the drawings referred to in the present embodiment, the same portions or portions having similar functions are denoted by the same reference numerals or similar reference numerals (only A, B, etc. are denoted after numerals), and a repetitive description thereof may be omitted. For convenience of description, the dimensional ratio of the drawings may be different from the actual ratio, or a part of the configuration may be omitted from the drawings.

First Embodiment

[1. Constituent of Electronic Keyboard Device]

FIG. 1 is a diagram illustrating an external view of an electronic keyboard device according to a first embodiment of the present disclosure. The electronic keyboard device 1 is, for example, a synthesizer including a keyboard unit 80. The keyboard unit 80 includes a plurality of keys. An electronic keyboard device 1 generates a sound signal when the key is operated by a user or when a playback of music data by a sequencer is instructed.

The sound signal is output from a signal output unit 65. The sound signal may be output from a speaker 60 according to the setting. In this example, the electronic keyboard device 1 can change the sound by varying a plurality of parameter values used in generating the sound signal by operation elements such as a knob 21, a slider 23, a touch sensor 25 and a button 27. If the knob 21, the slider 23, the touch sensor 25, and the button 27 need not be described individually, it may be described as an operation unit 20.

According to the technique disclosed in the above-described patent document, various performance expressions can be performed even in an operation to one controller. On the other hand, in order to realize such a performance expression, it is necessary to preset control modes of a plurality of parameters. As the number of parameter types increases, it takes a great deal of time to perform this setting. According to an embodiment of the present disclosure, a setting for controlling a plurality of parameters can be easily realized by an operation to one controller.

According to an embodiment of the present disclosure, when a master knob 30 is operated, the electronic keyboard device 1 collectively controls the plurality of parameter values on the basis of various tables. Hereinafter, a configuration for realizing such control will be described in detail.

Figure 2:
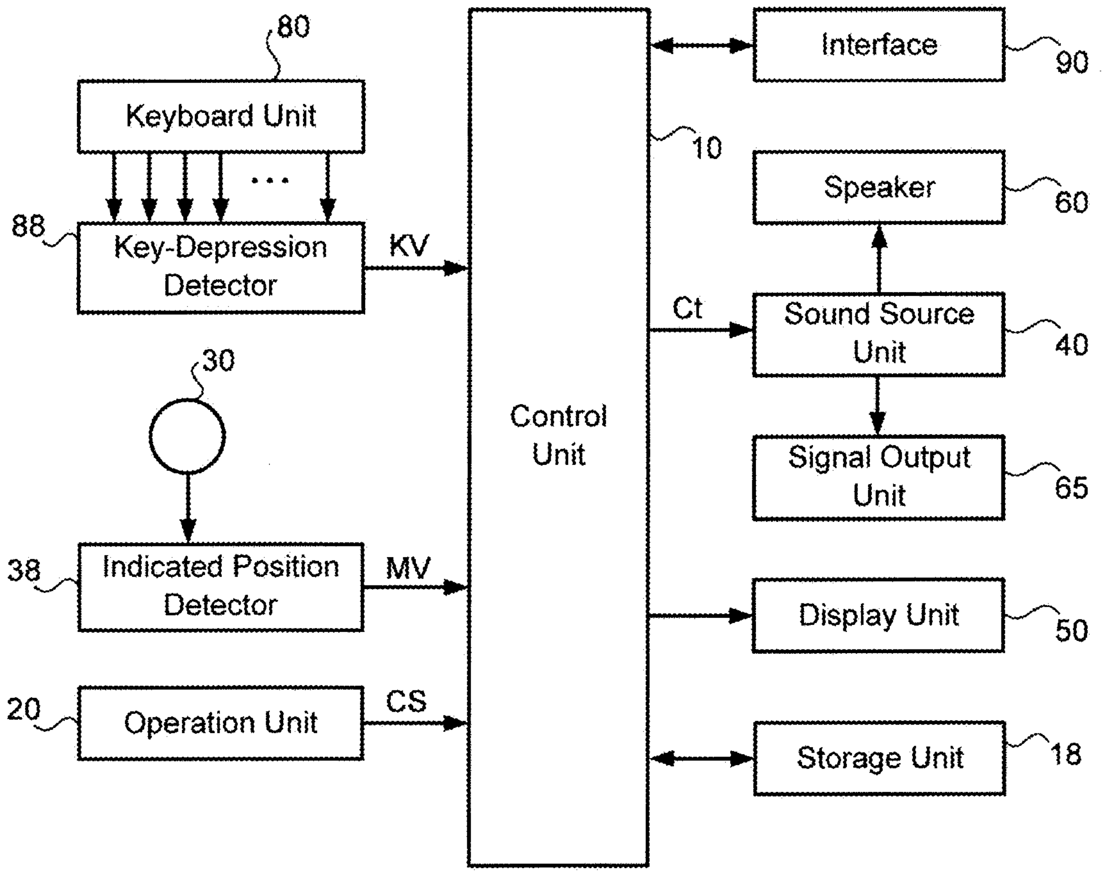
FIG. 2 is a diagram illustrating a configuration of an electronic keyboard device according to the first embodiment.

FIG. 2 is a diagram illustrating a configuration of the electronic keyboard device according to the first embodiment. The electronic keyboard device 1 includes a control unit 10, a storage unit 18, the operation unit 20, the master knob 30, a sound source unit 40, a display unit 50, the speaker 60, the signal output unit 65, the keyboard unit 80, and an interface 90. The electronic keyboard device 1 includes a plurality of sensors. In this example, the plurality of sensors includes an indicated position detector 38 and a key-depression detector 88.

The control unit 10 is an example of a computer including a calculation processing circuit such as a CPU and a memory device such as RAM, ROM, and the like. The control unit 10 executes the control program stored in the storage unit 18 by the CPU to implement various functions in the electronic keyboard device 1 by instructions written in the program. The various functions include a parameter control function 100 (refer to FIG. 7) described below. The programs may be provided from an external device and installed in the storage unit 18.

The keyboard unit 80 includes a plurality of keys rotatably supported on a housing 95. The key-depression detector 88 outputs the depressed key and a detection signal KV corresponding to a pressing amount of the depressed key to the control unit 10. The operation unit 20 includes the knob 21, the slider 23, the touch sensor 25, and the button 27 (see FIG. 1) as described above, and receives an instruction to be input to the electronic keyboard device 1 by the user. The operation unit 20 outputs an operation signal CS corresponding to the input user's instructions to the control unit 10.

The display unit 50 is a display device such as a liquid crystal display and displays various screens by control of the control unit 10. The display unit 50 functions as a touch panel together with the touch sensor 25 described above. In this example, the interface 90 includes a terminal for connecting the external devices such as controllers, to the electronic keyboard device 1. The interface 90 may include a terminal and the like for sending and receiving MIDI data.

The sound source unit 40 generates a sound signal based on a sound source control signal Ct output from the control unit 10. The generated sound signal is supplied to the signal output unit 65 and may be further supplied to the speaker 60. Whether the sound signal is output to the speaker 60 may be determined according to the setting. The sound source control signal Ct includes information required for generating a sound signal, such as information for controlling generation of sounds such as note number, note on, and note off, information for controlling effects such as reverb, chorus, phasor, and wow, and information for setting a timbre.

In this example, the parameters used for setting the timbre include a plurality of parameters used in FM (Frequency Modulation) synthesis. The parameters of the FM synthesis include an algorithm that defines the connection relation of a plurality of operators (carriers, modulators), and parameters (output level, frequency, etc.) for controlling the waveform of each operator.

The sound source unit 40 may be implemented in hardware, such as DSP, or may be implemented in software. In the latter case, the function of the sound source unit 40 may be realized by executing a program stored in the memory or the like by the CPU. Part of the functions of the sound source unit 40 may be realized by software and the rest may be realized by hardware.

The signal output unit 65 is a terminal for outputting the sound signal supplied from the sound source unit 40 to the external device. The speaker 60 generates a sound corresponding to the sound signal by amplifying and outputting the sound signal supplied from the control unit 10 or the sound source unit 40.

The master knob 30 (the first operation element) is a rotary encoder in this example. Both the knob 21 and the master knob 30 are rotary encoders. In this example, the diameter and height of the master knob 30 is greater than the diameter and height of the knob 21.

The indicated position detector 38 detects the indicated position of the master knob 30, and outputs an indicating value MV (first indicating value) corresponding to the indicated position to the control unit 10. The indicating value MV may include information indicating the indicated position of the master knob 30 itself (in this example, an integer from "0" to "127"). The indicating value MV may include information indicating an amount of operation on the master knob 30 (a variation amount of the indicated position), i.e., information indicating the indicated position relative to each other. In this example, the indicating value MV is information indicating the indicated position.

The storage unit 18 is a memory device such as a non-volatile memory and includes an area that stores a control program executed by the control unit 10, an area that stores music data, and a plurality of tables for use in controlling the sound source unit 40, respectively. The plurality of tables include a configuration table, a parameter conversion table, and a value conversion table. The music data is described in a predetermined format such as MIDI format and is data for controlling sound generation timings and the like in the sound source unit 40.

Figures 3, 4:
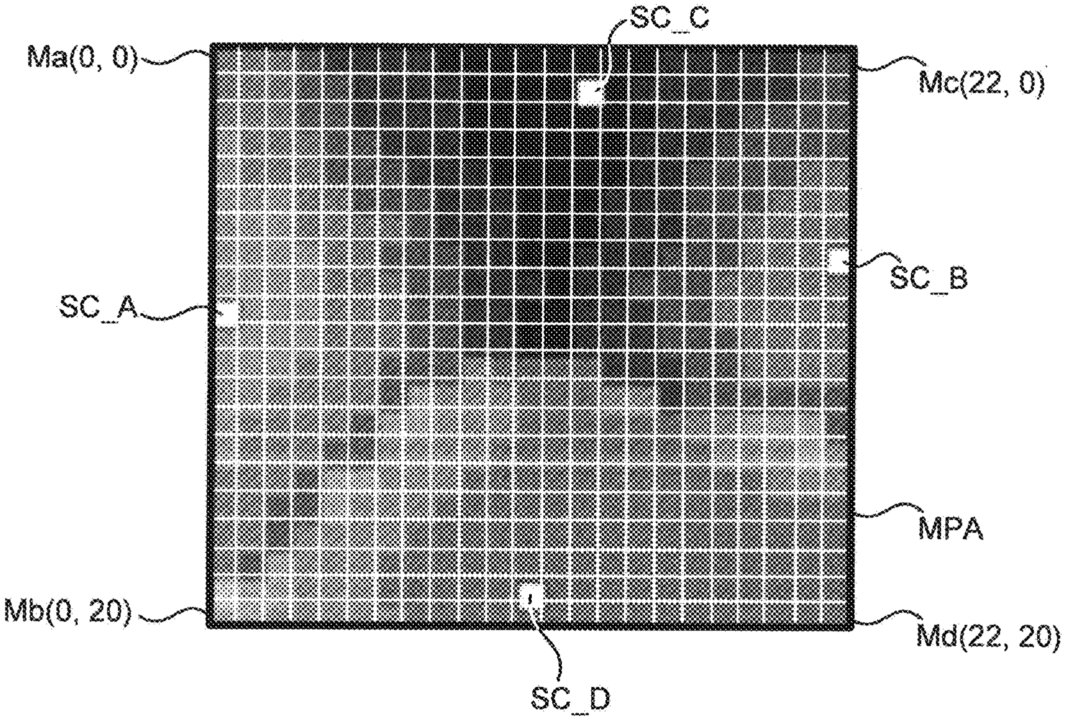
FIG. 3 is a diagram illustrating a setting table according to the first embodiment.
FIG. 4 is a diagram illustrating a mapping area according to the first embodiment.

FIG. 3 is a diagram illustrating a setting table according to the first embodiment. In this example, the setting table includes information for setting the timbre to be generated, and defines values corresponding to a plurality of types of parameters PM_1, PM_2, . . . . PM_n. The setting table in FIG. 3 shows an example including four timbre settings from setting A to setting D. The setting table may include settings other than timbre setting, as long as the setting information includes information for setting regarding sound generation in the sound source unit 40.

Parameter values corresponding to PM_1 is information represented by a four-dimensional One-Hot vector. That is, PM_1 indicates one of four pieces of information by combining a plurality of parameter values in which only one of the four dimensions is "1" and the other is represented by "0". Parameter values corresponding to PM_2 is information indicating any of the numbers in the predetermined range, and in this example is information indicating any of the numbers in the range represented by 8 bits, that is, "0" to "127". Each of the plurality of types of parameters PM_1, PM_2, . . . . PM_n is indicated by information represented by the One-Hot vector or information representing any of a predetermined range of numbers. The information represented by the One-Hot vector is used as information in which the feature amount includes categorical variables. The information to be the categorical variable is, for example, information indicating the type of algorithm in the FM synthesis. The information indicating any of the predetermined range of numbers is used as information having a linear relation relative to the variation of the feature amount, for example, the output level of the operator. When the frequency or the like is used as the parameter, the frequency or the like may be used as a logarithm converted parameter value. Neither of the parameters PM_1, PM_2, . . . . PM_n may contain information represented by the One-Hot vector.

A coordinate setting unit 210 (refer to FIG. 7) described later has a function of mapping a parameter set of a plurality of timbre settings (settings A to D in this example) to a two-dimensional plane, that is, an area defined by two coordinate axes (hereinafter, referred to as a mapping area). For example, in the case of the setting A, the parameter set includes information obtained by vectorizing each parameter value, such as information (0, 1, 0, 0, 83, 55, . . . , 25). Among the coordinates of the mapping area, the parameter set is also assigned by the self-organizing mapping to the coordinate other than the coordinate to which the timbre setting defined in the setting table is assigned. Each value of the vector of parameter sets may be normalized to convert it to a value in the range of 0 to 1. This transformation may be performed upon processing by self-organizing mapping. A method of assigning a parameter set to each coordinate by self-organizing mapping may employ a known method. Known methods are exemplified in, for example, Japanese laid-open patent publication No. 2011-197429. This mapping area will be described referring to FIG. 4.

FIG. 4 is a diagram illustrating the mapping area in the first embodiment. In this case, the coordinates in a mapping area MPA are specified by "0" to "22" on the horizontal axis and "0" to "20" on the vertical axis. The number of the coordinates on the vertical axis and on the horizontal axis may be set by the user.

The coordinates of the four corners in the mapping area MPA are defined as Ma (0,0), Mb (0,20), Mc (22,0), and Md (22,20) as shown in FIG. 4. In the example shown in FIG. 4, the parameter sets of setting A, setting B, setting C, and setting D are assigned to the coordinates SC_A, SC_B, SC_C, and SC_D, respectively. The color of each coordinate is determined according to the assigned parameter set. The more similar the colors of the two coordinates, the closer (similar) the distance between the parameter sets. This distance may be calculated using only some of the parameters of the parameter set. In FIG. 4, the color of each coordinate is expressed in gray scale for convenience although is expressed in color as an actual screen display. Therefore, in FIG. 4, the vicinity of the coordinates SC_A, SC_B, and SC_C appear to have similar colors to each other. Actually, however, the colors of the respective coordinates are red, blue, and green, for example, and have colors different from each other. The difference in color may be expressed in such a manner that at least one information of hue, saturation, and lightness is different from each other. That is, the actual screen display may also be expressed in gray scale as shown in FIG. 4. The relation between the parameter set and the color can be defined or changed by a user's instruction.

FIG. 5 is a diagram illustrating the parameter conversion table according to the first embodiment. The parameter conversion table is information (setting information) specifies the parameter set assigned to the coordinates of the mapping area MPA. The coordinates (0, 9) correspond to the coordinates SC_A shown in FIG. 4. Therefore, the parameter sets (0, 1, 0, 0, 83, 55, . . . , . . . , 25) corresponding to the setting A are assigned to the coordinates (0, 9). This parameter translation table is generated as a result of the assignment of a parameter set to the mapping area MPA by the coordinate setting unit 210.

FIG. 6 is a diagram illustrating the value conversion table according to the first embodiment. The value conversion table defines the correspondences between the respective values of the possible ranges ("0" to "127") of the indicating value MV and the coordinate of the mapping area MPA. Hereinafter, the coordinate corresponding to the indicating value MV is referred to as an indicated coordinate. When the indicated coordinates from the minimum value to the maximum value of the indicating value MV are drawn in the mapping area MPA, an indicated coordinate SP corresponding to the indicating value MV "0" and an indicated coordinate EP corresponding to the indicating value MV "127" become a predetermined locus (in this example, a straight line) (see FIG. 8). The value conversion table is generated by a route setting unit 230 (see FIG. 7) which will be described later.

[2. Configuration of Parameter Control Functions]

Next, the parameter control function 100 implemented in the control unit 10 will be described referring to FIG. 7.

Figure 7:
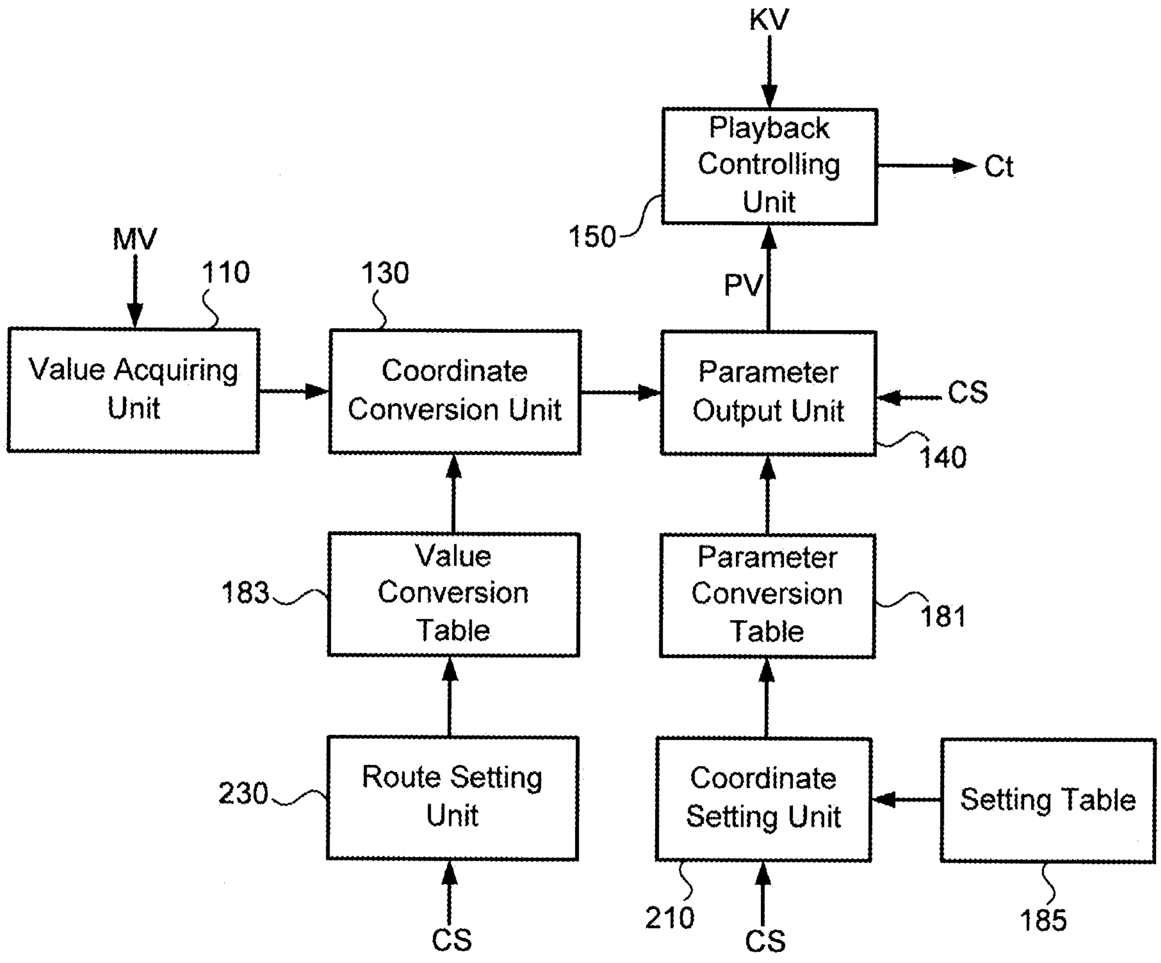
FIG. 7 is a diagram illustrating a parameter control function according to the first embodiment.

FIG. 7 is a diagram illustrating the parameter control function according to the first embodiment. The control unit 10 realizes the parameter control function 100 in the electronic keyboard device 1 by executing control programs. The parameter control function 100 includes a value acquiring unit 110, a coordinate conversion unit 130, a parameter output unit 140, a playback control unit 150, the coordinate setting unit 210, and the route setting unit 230. All of these configurations may be realized by software, or at least a part thereof may be realized by hardware.

The coordinate setting unit 210 reads out the timbre setting defined in a setting table 185 based on the user's instruction indicated by the operation signal CS, and maps the parameter set corresponding to the timbre setting to the mapping area MPA. The coordinate setting unit 210 uses the operation unit 20 and the display unit 50 to provide an interface for the user to enter information required for this mapping. The information input by the user includes, for example, a timbre setting to be mapped to the mapping area MPA among a plurality of timbre settings defined in the setting table 185 and an instruction to re-execute the self-organizing mapping. The coordinate setting unit 210 maps the parameter sets to the mapping area MPA by the process of self-organizing mapping, and generates a parameter conversion table 181 corresponding to the mapping result.

The route setting unit 230 sets the indicated coordinate corresponding to the indicating value MV in the mapping area MPA based on the user's instruction indicated by the operation signal CS. The route setting unit 230 uses the operation unit 20 and the display unit 50 to provide an interface for the user to enter information required for this setting. The route setting screen used in this interface will be described referring to FIG. 8.

Figure 8:
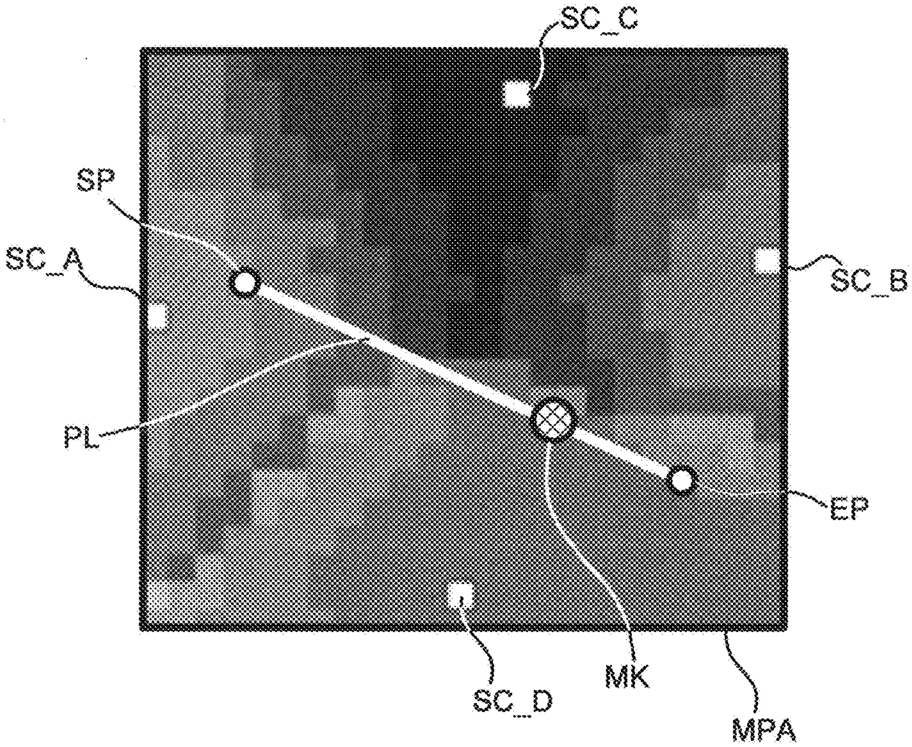
FIG. 8 is a diagram illustrating a display example of a route setting screen according to the first embodiment.

FIG. 8 is a diagram illustrating a display example of the route setting screen according to the first embodiment. The mapping area MPA shown in FIG. 8 is the same as that shown in FIG. 4. As illustrated in FIG. 8, the user specifies a route PL connecting a start point coordinate SP and an end point coordinate EP by specifying the start point coordinate SP and the end point coordinate EP in the mapping area MPA. At this time, the route setting unit 230 causes the start point coordinate SP to correspond to the indicating value MV "0" and causes the end point coordinate EP to correspond to the indicating value MV "127", thereby obtaining the respective coordinates on the route PL. Each coordinate on the route PL is obtained by equally dividing the route PL by the number of divisions (127) that can be taken by the indicating value MV. The route setting unit 230 assigns the plurality of coordinates obtained by the division to the corresponding indicating value MV.

In this manner, the route setting unit 230 sets the route PL in the mapping area MPA based on the information specified by the user. The route setting unit 230 associates each coordinate on the route PL with each of the indicating values MV "O" to MV "127" as the indicated coordinates. The route setting unit 230 generates a value conversion table 183 that defines the correspondence between the indicating value MV and the indicated coordinate. The value conversion table 183 generated by the setting of the example shown in FIG. 8 corresponds to the example of the value conversion table shown in FIG. 6.

The value acquiring unit 110 (value acquiring unit) acquires the indicating value MV and supplies the indicating value MV to the coordinate conversion unit 130. The coordinate conversion unit 130 refers to the value conversion table 183 and supplies the indicated coordinate corresponding to the indicating value MV to the parameter output unit 140. In this manner, the coordinate conversion unit 130 converts the indicating value MV into the indicated coordinate. Apart from the interface provided by the route setting unit 230, the control unit 10 may display a screen corresponding to FIG. 8 on the display unit 50 and may clearly display an instruction marker MK indicating the indicated coordinate obtained by the coordinate conversion unit 130 in the mapping area MPA. In this manner, since the instruction marker MK moves on the route PL in response to the operation of the master knob 30, the user can also confirm the position of the instruction marker MK on the route PL corresponding to the indicating value MV with the display unit 50.

The parameter output unit 140 refers to the parameter conversion table 181, and outputs the parameter set corresponding to the indicated coordinate to the playback control unit 150 as a plurality of parameter values PV. Based on the operation signal CS from the operation unit 20 (a second operation element), the parameter output unit 140 may vary at least one parameter value from the plurality of parameter values PV output last and output the varied parameter values.

The playback control unit 150 generates and supplies the sound source control signal Ct to the sound source unit 40 based on the information input. The playback control unit 150 generates the sound source control signal Ct based on the detection signal KV in response to acquiring the detection signal KV from the key-depression detector 88. In this instance, the sound source control signal Ct is a signal for controlling the sound source unit 40 to generate a sound signal to be generated based on the detection signal KV. The playback control unit 150 may read the music data from the storage unit 18 and generate the sound source control signal Ct based on the music data. In this instance, the sound source control signal Ct is a signal for controlling the sound source unit 40 to generate a sound signal to be generated based on the music data.

The playback control unit 150 generates the sound source control signal Ct for setting the timbre based on the parameter values PV to the sound source unit in response to acquiring the parameter values PV from the parameter output unit 140. With such a sound source control signal Ct, the sound source unit 40 generates the sound signal to be generated in response to the detection signal KV using the waveform of the timbre based on the parameter values PV. The parameter control function 100 has been described above.

[3. Processing of Parameter Control Method]

Next, a flow of processing in the parameter control function 100 (a parameter control method) will be described referring to FIG. 9.

Figure 9:
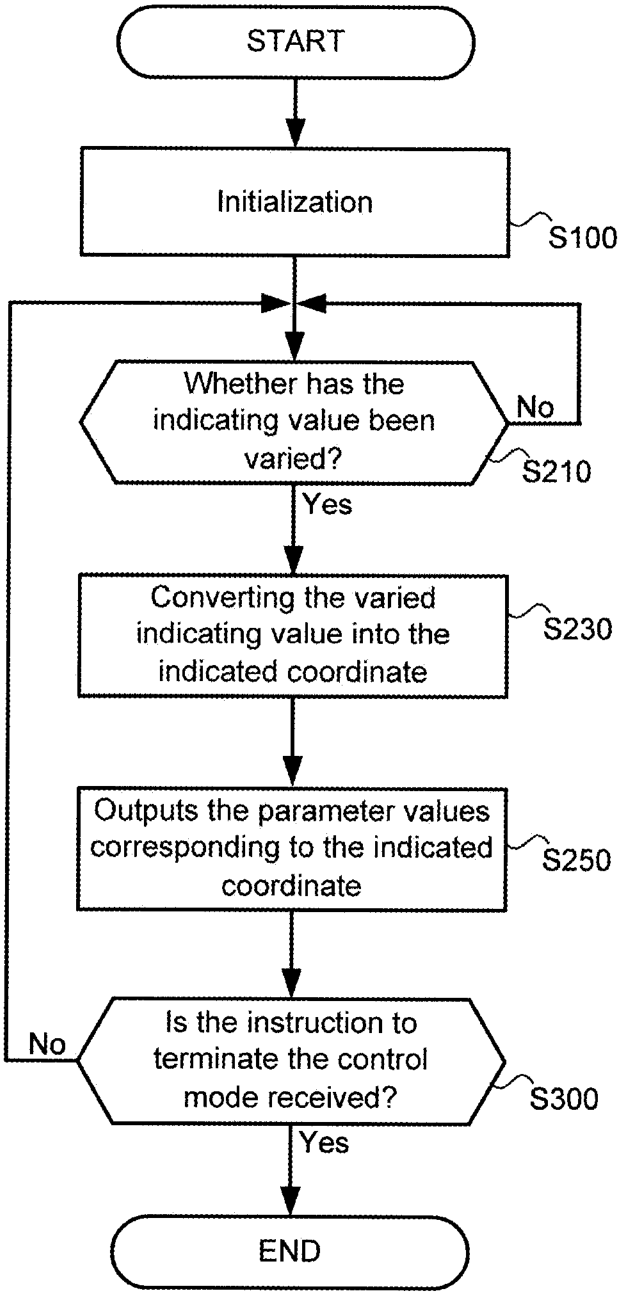
FIG. 9 is a flowchart illustrating a parameter control method according to the first embodiment.

FIG. 9 is a flowchart illustrating a parameter control method according to the first embodiment. When the mode is switched to the control mode for starting the parameter control function 100, this flow is started. The switching to the control mode is executed, for example, when the control unit 10 acquires a predetermined operation signal CS from the operation unit 20.

First, the control unit 10 performs an initialization (step S100). The initialization includes a process of setting the indicating value MV to the initial value (e.g., "0"). The parameter control method described here particularly shows a method by the output of the parameter values PV, the output of the sound source control signal Ct by the playback control unit 150 described above is executed in parallel with the process of the parameter control method.

The control unit 10 determines whether or not the indicating value MV has been varied (step S210). The control unit 10 waits until a variation of the indicating value MV occurs (step S210; No). This state is referred to as a standby state. When the indicating value MV is varied, the control unit 10 (the coordinate conversion unit 130) converts the varied indicating value MV into the indicated coordinate (step S230). Subsequently, the control unit 10 (the parameter output unit 140) outputs the plurality of parameter values PV corresponding to the indicated coordinate (step S250). When there is no instruction to terminate this control mode (step 300; No), the control unit 10 returns to the above-described standby state. On the other hand, when there is an instruction to terminate the control mode (step S300; Yes), the control unit 10 terminates the process in the parameter control function 100. The parameter control method has been described above.

By providing the sound source control signal Ct generated as described above to the sound source unit 40, the sound signal generated in the sound source unit 40 is changed in real time. At this time, the parameter output from the parameter output unit 140 is controlled by using the mapping area MPA in which the parameter set including the plurality of parameters are assigned to the respective coordinates. Therefore, even if there are many types of parameters (types of parameters equal to or larger than the number of coordinate axes), these parameters can be easily set in the sound source unit 40.

Further, since the indicated coordinate corresponding to the indicating value MV is set, the coordinate on the mapping area MPA can be easily specified by operating the operation element such as the master knob 30. When the indicated coordinate is specified by the route PL as shown in FIG. 8, the indicated coordinate can be varied so as to gradually vary the setting between the two points by operating the master knob 30.

Further, by simply changing either the parameter conversion table 181 or the value conversion table 183, the variation of the parameter values PV in response to the operation of the master knob 30 can be made different. Therefore, even a simple operation such as operating the master knob 30, it is possible to realize various changes in sounds easily.

Second Embodiment

In the first embodiment, the route PL set in the route setting unit 230 is a straight line connecting the start point coordinate SP and the end point coordinate EP. The route PL may be a route combining a plurality of straight lines or a route including curves. In the second embodiment, an example of a route in which the start point coordinate SP and the end point coordinate EP are connected by a curve will be described.

Figure 10:
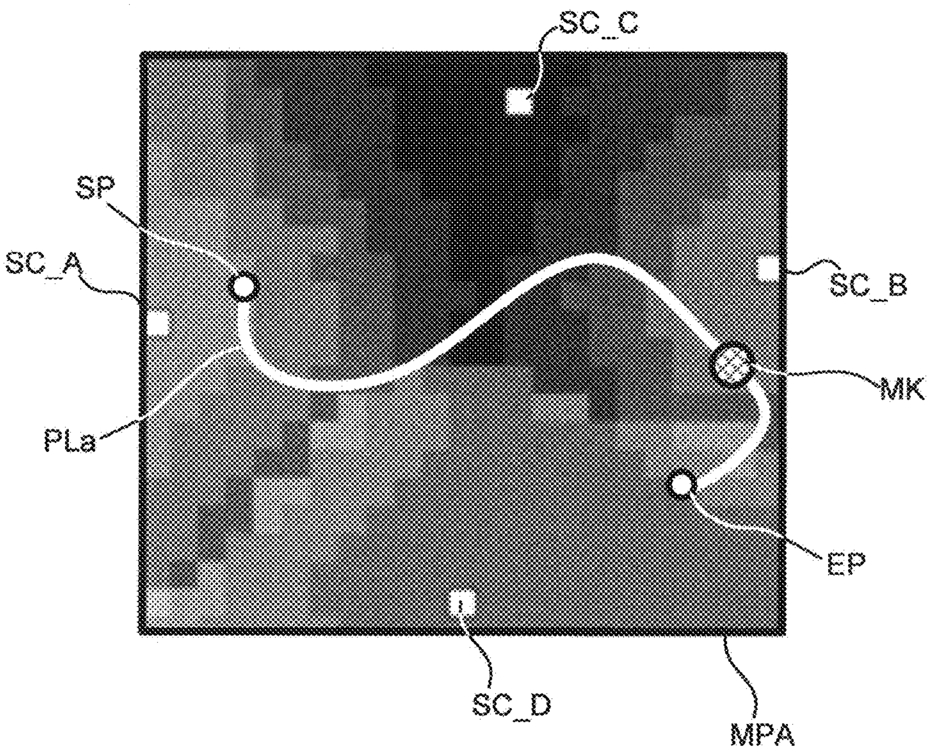
FIG. 10 is a diagram illustrating an example of displaying a route setting screen according to the second embodiment.

FIG. 10 is a diagram illustrating a display example of a route setting screen according to the second embodiment. According to the mapping area MPA shown in FIG. 10, a route PLa connects the start point coordinate SP and the end point coordinate EP by a curve. The route setting unit 230 (a locus setting unit) may provide an interface to the user such that, for example, a locus drawn on the mapping area MPA can be set as the route PLa by moving the finger with touching on the touch sensor 25. Even when the route is set by the locus in the mapping area MPA, the route may be controlled so as to be limited to a straight line not limited to a curved line. Even such a route can be defined by the value conversion table in the same manner as in the first embodiment.

Third Embodiment

In the first embodiment, the route setting unit 230 equally divides the route PL between the start point coordinate SP and the end point coordinate EP by the number (127) of divisions that can be taken by the indicating value MV, thereby making the respective coordinate correspond to the indicating value MV. That is, the variation amount of the indicating value MV by the operation of the master knob and the movement amount of the instruction marker MK are in a proportional relation. In the third embodiment, an example will be described in which the relation between the variation amount of the indicating value MV and the movement amount of the instruction marker MK differs between a part of the range that the indicating value MV can take and other parts.

Figure 11:
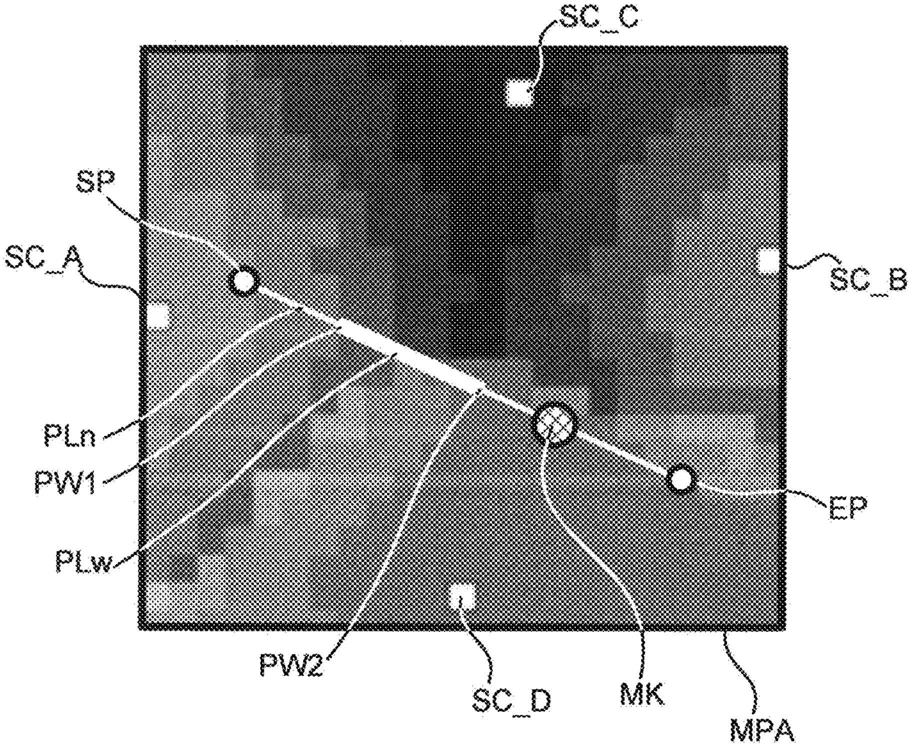
FIG. 11 is a diagram illustrating an example of displaying a route setting screen according to the third embodiment.

FIG. 11 is a diagram illustrating a display example of a route setting screen according to the third embodiment. The route displayed in the mapping area MPA shown in FIG. 11 includes a route PLn and a route PLw displayed thicker than the route PLn. In this example, the value conversion table is defined so that the movement amount of the instruction marker MK along the route PLw with respect to the variation amount of the indicating value MV is larger than that along route PLn, when the indicating value MK is varied. An increase in the movement amount of the instruction marker MK corresponds to an increase in the variation amount of the indicated coordinate. In this manner, it is possible to vary the indicated coordinate with fine accuracy in a portion where the instruction marker MK slowly moves, such as the vicinity of the start point coordinate SP and the end point coordinate EP. The variation amount of the indicated coordinate by the variation of the indicating value MV may be changed in more steps without the limitation to be changed in two steps.

For example, the route setting unit 230 may provide the user with an interface for specifying some range on the route between the start point coordinate SP and the endpoint coordinate EP. The route setting unit 230 may set the variation amount of the indicated coordinate with respect to the variation amount of the indicating value MV in the specified range to be different from the state set as in the first embodiment. For example, in the example of FIG. 11, by specifying a coordinate PW1 and a coordinate PW2, the route setting unit 230 sets the range between the coordinate PW1 and the coordinate PW2 as the route PLw. Even in the case of setting a route in which the variation amount of the indicated coordinate with respect to the variation amount of the indicating value MV in a part of the route is different from the variation amount in the other portions, the route can be defined by the value conversion table in the same manner as in the first embodiment.

The variation amount of the indicated coordinate with respect to the variation of the indicating value MV may be determined in accordance with the variation amount (the distance from each other) of the parameter set assigned to the respective coordinates. For example, the variation amount of the indicated coordinate may be determined so that the relation between the variation amount of the distance of the parameter set with respect to the variation amount of the indicating value MV and the variation amount of the indicated coordinate is maintained.

Fourth Embodiment

In the first embodiment, the route PL set in the route setting unit 230 is a straight line connecting the start point coordinate SP and the end point coordinate EP. The route PL may be a route divided in the middle. In the fourth embodiment, an example in which one dividing position is provided in the route from the start point coordinate SP to the end point coordinate EP will be described.

Figure 12:
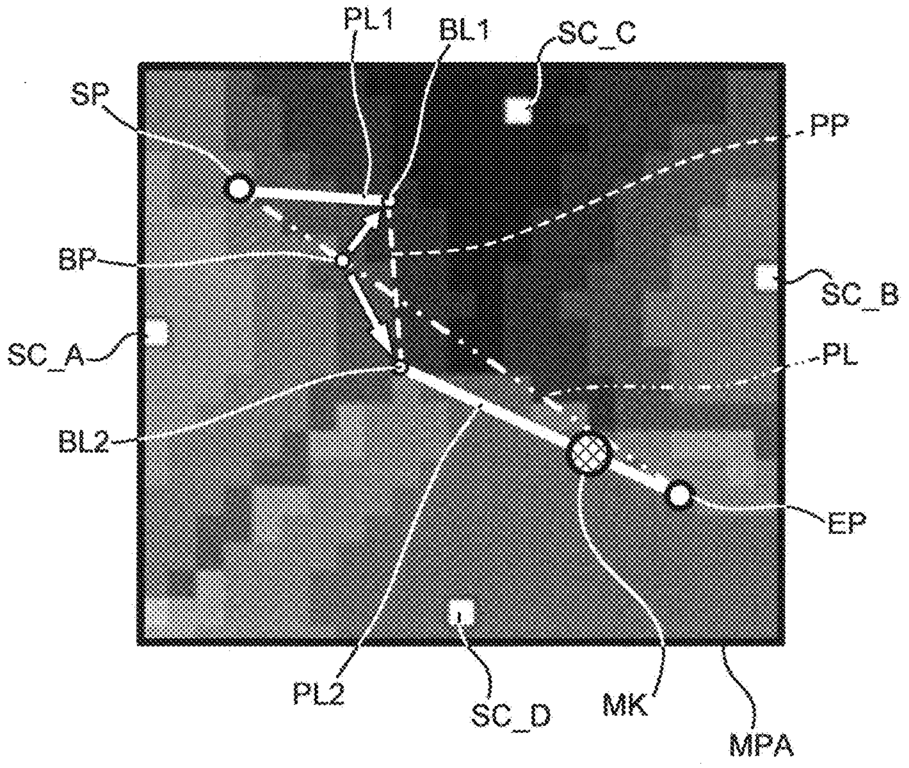
FIG. 12 is a diagram illustrating an example of displaying a route setting screen according to the fourth embodiment.

FIG. 12 is a diagram illustrating a display example of a route setting screen according to the fourth embodiment. According to the mapping area MPA shown in FIG. 12, the route between the start point coordinate SP and the end point coordinate EP is divided into a first route PL1 and a second route PL2, and a dividing position BL1 of the first route PL1 and a dividing position BL2 of the second route PL2 are connected by a virtual connecting route PP. The two dividing positions BL1, BL2 connected by the virtual connecting route PP are set as values adjacent to each other for the indicating value MV. That is, when the indicating value MV shifts to the next value after the instruction marker MK reaches the dividing position BL1 of the first route PL1 from the start point coordinate SP by the variation of the indicating value MV, the instruction marker MK shifts to the position connected by the virtual connecting route PP, that is, to the dividing position BL2 of the second route PL2.

For example, the route setting unit 230 may provide the user with an interface for specifying the position BP dividing into the first route PL1 on the side of the start point coordinate SP and the second route PL2 on the side of the end point coordinate EP on the route PL (shown virtually by a two-dot chain line) set as in the first embodiment, and for specifying the coordinate of the dividing position BL1, BL2 of the two routes PL1, PL2 by the touch sensor 25 or the like. Even a route divided in the middle can be defined by the value conversion table in the same manner as in the first embodiment.

Fifth Embodiment

In the first embodiment, the parameter set is assigned to each coordinate of the mapping area MPA. The parameter set may not be assigned to some coordinates. The coordinate in which no parameter set is assigned may be obtained by calculating based on the parameter set assigned to some coordinates. In the fifth embodiment, an example in which the parameter set is assigned only to the coordinates of the four corners of the mapping area MPA will be described.

Figure 13:
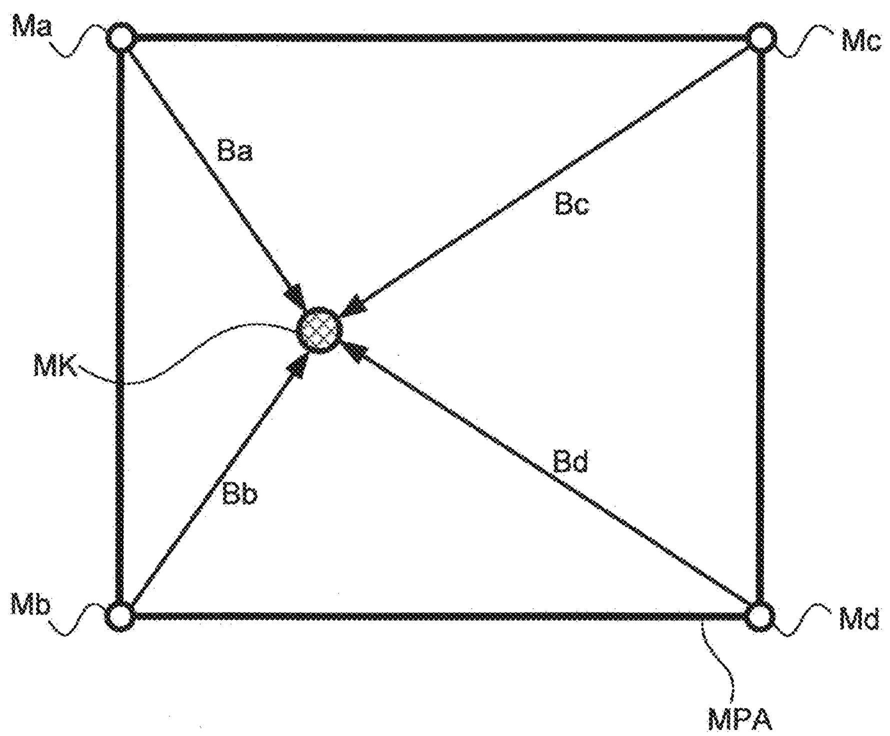
FIG. 13 is a diagram illustrating an example of displaying a route setting screen according to the fifth embodiment.

FIG. 13 is a diagram illustrating a display example of a route setting screen according to the fifth embodiment. In the mapping area MPA shown in FIG. 13, parameter sets (reference values) are assigned to coordinates Ma, Mb, Mc, and Md (reference coordinates) at the four corners. In this embodiment, the information represented by the above-described One-Hot vector is not included. The information may be included. The parameter set corresponding to the position of the instruction marker MK is calculated by a calculation method using the parameter set assigned to the coordinates Ma, Mb, Mc, Md and the positional relations Ba, Bb, Bc, Bd of the instruction marker MK with respect to the coordinates Ma, Mb, Mc, Md. This calculation method may be a known method. This calculation method may be, for example, a method using linear interpolation, a principal component analysis method or a multi-dimensional scaling method.

<Modifications>

While an embodiment of the present disclosure has been described above, an embodiment of the present disclosure may also be modified into various forms as follows. In addition, the above-described embodiments and the modified examples described below can be applied in combination with each other. Further, it is possible to add, delete, or replace another configuration for a part of the configuration of each embodiment. In the following description, a modified example of the first embodiment will be described. The modified example may be applied to other embodiments.

(1) The parameter control function 100 has been implemented in the control unit 10 in the electronic keyboard device 1. The parameter control function 100 may be implemented in the control unit in other devices. For example, when the parameter control function 100 is implemented in a tablet terminal, at least the control unit 10 may be included in the tablet terminal, and at least a part of other components such as the operation unit 20 and the master knob 30 may be implemented as the external devices connected to the tablet terminal. The parameter control function 100 may be implemented in a device connected to a network such as a cloud server.

In addition, the parameter control function 100 may be realized by cooperating a plurality of devices. For example, the functions of the value acquiring unit 110 and the parameter output unit 140 may be implemented in a first device, and other functions may be implemented in a second device. At this time, the first device and the second device need only be capable of transmitting and receiving various signals by wire or wirelessly. It should be noted that the present disclosure can be established as long as the functions implemented in the first device in this example, that is, the functions of the value acquiring unit 110 and the parameter output unit 140 are included and the required information can be acquired from the external devices.

The parameter control function 100 may be implemented in a device that does not include the keyboard unit 80, or may be implemented in a device that does not include the playing operation element.

(2) The master knob 30 is a rotary encoder mounted on the housing 95. As long as it is a control device that can be used to output a signal corresponding to the indicating value MV, it may not have the form of a knob, it may be other configurations such as a form of receiving an input by another operation method such as a slider. The control device may be an external device connected to the interface 90 (for example, a foot controller, a turntable, a touch panel, etc) e (3) The parameter values PV can be corrected by the operation to the operation unit 20 when the operation to the master knob 30 is controlling to vary the plurality of parameter values PV. The parameter values PV may not be corrected by the operation of the operation unit 20 when such control is being performed.

(4) The value conversion table 183 is generated by the route setting unit 230 based on the user's instruction. The value conversion table 183 may be provided from an external device and stored in the storage unit 18. A plurality of value conversion tables may be registered in the electronic keyboard device 1, one of the value conversion tables may be selected according to the user's instruction and may be used as the value conversion table 183 in the parameter control function 100. In the case of play-backing music data or the like, the selected value conversion table may be changed as time elapses.

(5) The parameter conversion table 181 is generated by the coordinate setting unit 210 based on the user's instruction. The parameter conversion table 181 may be provided from an external device and stored in the storage unit 18. A plurality of parameter conversion tables may be registered in the electronic keyboard device 1, one of the parameter conversion tables may be selected according to the user's instruction and may be used as the parameter conversion table 181 in the parameter control function 100. In the case of play-backing music data or the like, the selected parameter conversion table may be changed as time elapses.

(6) The control unit 10 may change the route PL by changing the position of the instruction marker MK in response to operating the operation unit 20 (change the value conversion table).

(7) The mapping area MPA is the area (plane) defined by two coordinate axes. The mapping area MPA may be an area defined by more than two coordinate axes. For example, when an area (space) is defined by three coordinate axes, the three-dimensional space may be virtually displayed on a two-dimensional display screen in the display unit 50.

(8) By using the One-Hot vector, the accuracy of the allocation of the parameter set to the mapping area MPA by the process of the self-organized mapping can be improved even if the information does not have a linear relation to the variation of the feature amount, such as the type of the algorithm of the FM synthesis. By using such a One-Hot vector, settings can be mixed between different sound source methods in the timbre setting defined in the setting table.

(9) The value acquiring unit 110 acquires the indicating value MV output from the indicated position detector 38. The value acquiring unit 110 may acquire the indicating value MV output from the control unit 10 based on other information. For example, when play-backing the music data, the control unit 10 may output the indicating value MV that is varied in synchronization with the playback tempo, or may output the indicating value MV that is varied in synchronization with the envelopes of sounds. The control unit 10 may vary the indicating value MV and output it based on information that defines the time variation of the indicating value MV in advance. The variation of the indicating value MV in the control unit 10 may be a variation based on the indicating value MV output by the indicated position detector 38. That is, the value acquiring unit 110 may acquire the indicating value MV output based on a plurality of pieces of information.

(10) The parameter values PV have been used to change sounds, but may be used to change other than sounds, e.g., video. That is, the parameter values PV may be used to control a state of content such as sounds and videos. Accordingly, the present disclosure has a conceptual as a parameter control device, and it is merely an embodiment that the parameter control device for implementing the parameter control function 100 is used in the electronic keyboard device 1 and the like described above.

The above description relates to the modifications.

According to an embodiment of the present disclosure, there is provided a parameter control device including: a value acquiring unit for acquiring an indicating value of a first operation element; and a parameter output unit for outputting a plurality of parameter values corresponding to the acquired indicating value based on setting information and a correspondence relation between the indicating value and a coordinate in an area defined by a plurality of coordinate axes, the setting information being for setting a relation between a plurality of parameter values and a coordinate, the plurality of parameter values being for controlling a state of content. The parameter control device can also be configured as follows.

The area may be defined by two coordinate axes. The plurality of parameter values may include three or more types of parameter values.

The setting information may be for setting a plurality of values corresponding to each of the plurality of coordinates in the area. The parameter output unit may output a plurality of values set at the coordinate corresponding to the indicating values as the plurality of parameter values.

The setting information may define a plurality of reference values corresponding to each of a plurality of reference coordinates in the area. The parameter output unit may include outputting a result calculated from the plurality of reference values as the plurality of parameter values based on a relation between the coordinate corresponding to the indicating value and the plurality of reference coordinates.

At least two of the plurality of parameter values may define one type of parameter value by a combination thereof.

The parameter control device may further include: a display unit for displaying the area; and a locus setting unit for providing an interface for specifying a locus in the area displayed on the display unit, and setting a correspondence relation between the indicating value and the coordinate based on the locus.

A portion corresponding to the coordinate in the displayed area may be displayed in a color based on the plurality of parameter values corresponding to the coordinate.

The parameter output unit may vary at least one of the plurality of parameter values set at the coordinate corresponding to the indicating value in response to an operation signal from a second operation element to output the plurality of parameter values.

According to an embodiment of the present disclosure, there is provided a parameter control method including: acquiring an indicating value of a first operation element; and outputting a plurality of parameter values corresponding to the acquired indicating value, based on setting information and a correspondence relation between the indicating value and a coordinate in an area defined by a plurality of coordinate axes, the setting information being for setting a relation between a plurality of parameter values and a coordinate, the plurality of parameter values being for controlling a state of content.

According to an embodiment of the present disclosure, there is provided a program for causing a computer to: acquire an indicating value of a first operation element; and output a plurality of parameter values corresponding to the acquired indicating value, based on setting information and a correspondence relation between the indicating value and a coordinate in an area defined by a plurality of coordinate axes, the setting information being for setting a relation between a plurality of parameter values and a coordinate, the plurality of parameter values being for controlling a state of content.

What is claimed is:

1. A parameter control device comprising:

a display device;

a user interface including a first operation element;

a memory storing instructions; and a processor that implements the instructions to:

acquire an indicating value of the first operation element; and output a plurality of parameter values corresponding to the acquired indicating value, based on setting information and a correspondence relation between the acquired indicating value and a coordinate, among a plurality of coordinates, in an area defined by a plurality of coordinate axes, the setting information being for setting a relation between the plurality of parameter values and the coordinate in the area defined by the plurality of coordinate axes, the plurality of parameter values being for controlling a state of content;

display the area on the display device;

specify, via the user interface, a locus, which is a line, representing a route passing through specified points in the displayed area; and set, based on the specified locus, the correspondence relation between the acquired indicating value and each of coordinates on the specified locus, wherein each of the plurality of coordinates is associated with a plurality of different parameters associated with sound signal generation, wherein the displayed area displays the specified locus and an instruction marker on the specified locus, wherein a value conversion table defines the correspondence relation between the acquired indicating value and each of the coordinates on the specified locus, and wherein the instruction marker, which indicates a coordinate corresponding to the plurality of parameter values to be output, moves on the specified locus in response to an operation of the first operation element.

2. The parameter control device according to claim 1, wherein:

the plurality of coordinate axes defining the area are two coordinate axes, and the plurality of parameter values include three or more types of parameter values.

3. The parameter control device according to claim 1, wherein:

the setting information is for setting a plurality of values corresponding to each of the plurality of coordinates in the area, and the output plurality of parameter values include a plurality of values, among the plurality of values, set at the coordinate in the area corresponding to the acquired indicating value.

4. The parameter control device according to claim 1, wherein:

the setting information defines a plurality of reference values corresponding to each of a plurality of reference coordinates in the area, and the output plurality of parameter values include a result calculated from the plurality of the reference values based on a relation between the coordinate in the area corresponding to the acquired indicating value and the plurality of reference coordinates.

5. The parameter control device according to claim 1, wherein at least two parameter values, among the plurality of parameter values, define one type of parameter value by a combination thereof.

6. The parameter control device according to claim 1, wherein the processor implements the instructions to control the display device to further display a portion corresponding to the coordinate in the area in the displayed area in color based on the output plurality of parameter values corresponding to the coordinate in the area.

7. The parameter control device according to claim 1, wherein:

the user interface further includes a second operation element, and the processor implements the instructions to vary at least one of the output plurality of parameter values set at the coordinate in the area corresponding to the acquired indicating value in response to operation of the second operation element.

8. The parameter control device according to claim 1, wherein the content includes a sound signal.

9. The parameter control device according to claim 8, wherein the sound signal is generated by an electronic musical instrument.

10. The parameter control device according to claim 1, wherein the first operating element is configured to be manipulated by a user to move the instruction marker.

11. The parameter control device according to claim 1, wherein the line is straight or curved.

12. A method of controlling a parameter, the method comprising:

acquiring an indicating value of a first operation element of a user interface;

outputting a plurality of parameter values corresponding to the acquired indicating value, based on setting information and a correspondence relation between the acquired indicating value and a coordinate, among a plurality of coordinates, in an area defined by a plurality of coordinate axes, the setting information being for setting a relation between the plurality of parameter values and the coordinate in the area defined by the plurality of coordinate axes, the plurality of parameter values being for controlling a state of content;

defining, using a value conversion table, the correspondence relation between the acquired indicating value and the coordinate in the area;

displaying the area on the display device;

specifying, via the user interface, a locus, which is a line, representing a route passing through specified points in the displayed area;

setting, based on the specified locus, the correspondence relation between the acquired indicating value and each of coordinates on the specified locus; and displaying the specified locus in the displayed area and an instruction marker on the specified locus, wherein each of the plurality of coordinates is associated with a plurality of different parameters associated with sound signal generation, wherein the value conversion table defines the correspondence relation between the acquired indicating value and each of the coordinates on the specified locus, and wherein the instruction marker, which indicating a coordinate corresponding to the plurality of parameter values to be output, moves on the specified locus in response to an operation of the first operating element.

13. The method according to claim 12, wherein:

the plurality of coordinate axes defining the area are two coordinate axes, and the plurality of parameter values include three or more types of parameter values.

14. The method according to claim 12, wherein:

the setting information is for setting a plurality of values corresponding to each of the plurality of coordinates in the area, and the output plurality of parameter values include a plurality of values, among the plurality of values, set at the coordinate in the area corresponding to the acquired indicating value.

15. The method according to claim 12, wherein:

the setting information defines a plurality of reference values corresponding to each of a plurality of reference coordinates in the area, and the output plurality of parameter values include a result calculated from the plurality of the reference values based on a relation between the coordinate in the area corresponding to the acquired indicating value and the plurality of reference coordinates.

16. The method according to claim 12, wherein at least two parameter values, among the plurality of parameter values, define one type of parameter value by a combination thereof.

17. The method according to claim 12, wherein the displaying further displays a portion corresponding to the coordinate in the area in the displayed area in color based on the output plurality of parameter values corresponding to the coordinate in the area.

18. The method according to claim 12, wherein:

the user interface further includes a second operation element, and the method further comprises varying at least one of the output plurality of parameter values set at the coordinate in the area corresponding to the acquired indicating value in response to operation of the second operation element.

19. The method according to claim 12, wherein the content includes sound signal.

20. The method according to claim 19, wherein the sound signal is generated by an electronic musical instrument.

21. The method according to claim 12, wherein the first operating element is configured to be manipulated by a user to move the instruction marker.

22. The method according to claim 12, wherein the line is straight or curved.

* * * * *